(12) United States Patent
Yano (10) Patent No.: US 7,003,934 B1
(45) Date of Patent: Feb. 28, 2006

(54) HEAT SEAL DEVICE

(75) Inventor: Keiji Yano, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/830,686

(22) PCT Filed: Oct. 28, 1999

(86) PCT No.: PCT/JP99/05966

§ 371 (c)(1),
(2), (4) Date: Aug. 3, 2001

(87) PCT Pub. No.: WO00/26089

PCT Pub. Date: May 11, 2000

(30) Foreign Application Priority Data

Oct. 30, 1998 (JP) ............................... 10-310092

(51) Int. Cl.
  *B65B 9/12* (2006.01)
  *B65B 51/10* (2006.01)
(52) U.S. Cl. .................................. 53/552; 53/374.2
(58) Field of Classification Search ................ 53/547, 53/548, 550, 451, 551, 373.3, 552, 374.2, 53/374.3
See application file for complete search history.

(56) References Cited

U.S. PATENT DOCUMENTS

| | | | |
|---|---|---|---|
| 3,381,441 A | * | 5/1968 | Condo et al. .................. 53/452 |
| 3,608,709 A | * | 9/1971 | Pike ............................ 206/219 |
| 3,679,509 A | * | 7/1972 | Fielibert ..................... 156/182 |
| 3,692,613 A | * | 9/1972 | Pederson ..................... 156/498 |
| 3,849,965 A | * | 11/1974 | Dominici ....................... 53/451 |
| 4,288,965 A | * | 9/1981 | James ........................... 53/451 |
| 4,495,748 A | * | 1/1985 | Rowell .......................... 53/449 |
| 4,604,854 A | * | 8/1986 | Andreas ........................ 53/552 |
| 4,608,810 A | * | 9/1986 | Bordini ......................... 53/551 |
| 4,630,429 A | * | 12/1986 | Christine ....................... 53/479 |
| 4,691,499 A | * | 9/1987 | Umeda et al. ................. 53/451 |
| 5,038,550 A | * | 8/1991 | Wirsig et al. .................. 53/451 |
| 5,186,223 A | * | 2/1993 | Rummage et al. ............. 141/91 |
| 5,231,817 A | * | 8/1993 | Sadler ........................... 53/451 |
| 5,247,779 A | * | 9/1993 | Wirsig et al. .............. 53/374.2 |
| 5,250,140 A | * | 10/1993 | Hayashi et al. ........... 156/380.5 |
| 5,326,416 A | * | 7/1994 | Perrett ......................... 156/251 |
| 5,347,795 A | * | 9/1994 | Fukuda ......................... 53/552 |
| 5,475,964 A | * | 12/1995 | Fiesser et al. .................. 53/75 |

(Continued)

FOREIGN PATENT DOCUMENTS

JP          2-45308        *  2/1990

(Continued)

*Primary Examiner*—Stephen F. Gerrity
*Assistant Examiner*—Paul Durand
(74) *Attorney, Agent, or Firm*—Buchanan Ingersoll PC (57) ABSTRACT

A heat-sealing device moves a tube-shaped packaging material through operation of a seal jaw and counter jaw under the liquid surface of liquid food, and heat-seals a seal zone containing a cutting predetermined zone in the tube transverse direction. The tube-shaped packaging material is formed from the packaging material web, and is filled up with liquid food. The operation surface of the seal jaw facing the seal zone has a substantially flat surface. The heat-sealing device has a removal/mixture mechanism on the operation surface of the counter jaw. The removal/mixture mechanism removes seal prevention impurity from this seal zone and/or mixes the impurity with the melting/softening packaging material in this seal zone. Thus, even if the packaging laminated material is covered with an oxide, residual substances, or impurities, the heat-sealing device reduces the bad influence of the seal prevention impurity.

18 Claims, 5 Drawing Sheets

U.S. PATENT DOCUMENTS

| | | | |
|---|---|---|---|
| 5,714,033 A * | 2/1998 | Hayashi et al. | 156/380.5 |
| 5,787,690 A * | 8/1998 | Konno | 53/550 |
| 5,870,887 A * | 2/1999 | Bennett | 53/551 |
| 5,889,263 A * | 3/1999 | Andersson | 219/633 |
| 5,944,189 A * | 8/1999 | Vollenweider et al. | 206/484 |
| 6,047,521 A * | 4/2000 | Terminella et al. | 53/133.4 |
| 6,058,680 A * | 5/2000 | Meli et al. | 53/451 |
| 6,088,994 A * | 7/2000 | Nakagawa et al. | 53/51 |
| 6,216,420 B1 * | 4/2001 | Mazzetto et al. | 53/373.7 |
| 6,237,308 B1 * | 5/2001 | Quintin et al. | 53/451 |
| 6,301,859 B1 * | 10/2001 | Nakamura et al. | 53/373.7 |
| 6,350,340 B1 * | 2/2002 | Johnson | 156/252 |

FOREIGN PATENT DOCUMENTS

| | | | |
|---|---|---|---|
| JP | 2-120380 | * | 5/1990 |
| JP | 58-134744 | * | 8/1993 |
| JP | 9-323708 | * | 12/1997 |

* cited by examiner

HEAT SEAL DEVICE

FIELD OF THE INVENTION

This invention relates to a device which heat-seals tube shaped packaging material fabricated from a packaging material web in the transverse direction, and a filling machine utilizing this heat-sealing device to manufacture a packaging container filled with fluid food.

BACKGROUND OF THE INVENTION

A filled packaging container used for milk, fruits drink, etc. is generally made from laminated packaging material. The packaging material has a comparatively rigid main supporting layer covered with thin layers of plastic materials. This material can also contain materials such as aluminum foil. The common feature of this type of packaging laminated material is that the thermoplastic material (usually polyethylene) layer provided on the outside and inside of the laminated material is used to form a seal in a liquid tight state with heat and pressure. In order for a seal to have a desired strength and a desired liquid tight performance, both thermoplastic layers that are to be sealed should be clean, and should not include impurities. With a clean layer, sufficient melting of each thermoplastic layer can be obtained and, as a result, the optimum seal can be achieved by strong high sealing performance. Since impurities of the thin oxide formed on the packaging laminated material during the extrusion steps of thermoplastic layers usually exist in the thermoplastic layer, a perfect melting between the thermoplastic layers is occasionally prevented. Therefore, a seal cannot acquire the necessary strength and sealing performance. Moreover, when sealing packaging materials under liquid food, impurities associated with residual substances of the contents (liquid food) which hinders the sealing further may also be generated or present on the surface of the thermoplastic layer. This is a problem peculiar to the packaging filling system in which sealing of the laminated material is performed under the liquid surface of the liquid food. That is, in this packaging filling system, the content food must be first pushed out from the crevice between the surfaces of the thermoplastic materials before sealing.

However, as a practical matter, a very small quantity of residual substance remains, without the content food being completely squeezed out, and this residual substance weakens the seal.

SUMMARY OF THE INVENTION

The invention involves a device which can heat-seal the above-mentioned packaging laminated material so that all the above-mentioned problems may be avoided, and thereby provide optimum seal performance. The invention also provides a device which heat-seals the packaging laminated material to avoid the bad influence of seal prevention impurities as much as possible, while making an optimum seal possible, even if the packaging laminated material is covered with an oxide, the residual substance of the packaging content, or impurities.

The heat-sealing device heat-seals a tube shaped packaging material in the transverse direction under the surface of the liquid food. The tube-shaped packaging material is packaging material formed into the tube shape from a packaging material web, with the liquid food being filled up in this tube. The heat-sealing device pushes this tube from its outside by the seal jaw and the counter jaw, and heat-seals the tube in the transverse direction of the tube. The device heat-seals the seal zone of the packaging material containing a cutting predetermined zone under the surface of the liquid food. The operation surface of the seal jaw in contact with the seal zone has a substantially flat surface. The operation surface of the counter jaw includes a removal/mixture means. The removal/mixture means removes from the seal zone seal prevention impurity which may remain in the tube, and/or mixes the impurity with the melted or softened packaging material in the seal zone.

In a preferred form of this invention, the removal/mixture means may be a slope provided in the operation surface of the counter jaw. The slope may be in the form of a chevron-shaped operation surface of the counter jaw. In another preferred form of this invention, the removal/mixture means can be ridges continuously or discontinuously provided in the operation surface of the counter jaw. An inductor for forming a seal zone by high frequency induction heating may be arranged in the seal jaw, and the packaging material may comprise a metal thin layer and a thermoplastic material innermost layer.

In another preferred embodiment of this invention, a horn for forming a seal zone by ultrasonic heating may be arranged in the seal jaw, and the packaging material may comprise at least a thermoplastic material innermost layer. In another version of this invention, an electrical-resistor for forming a seal zone by heating is provided in the seal jaw, and the packaging material may have at least a thermoplastic material innermost layer.

The filling machine of this invention forms a packaging material web into a tube shape, fills up liquid food in the tube, and heat-seals and cuts the tube shape packaging material in the transverse direction. The filling machine of this invention utilizes the heat-sealing device mentioned above.

DETAILED DESCRIPTION OF THE INVENTION

Figure 3:
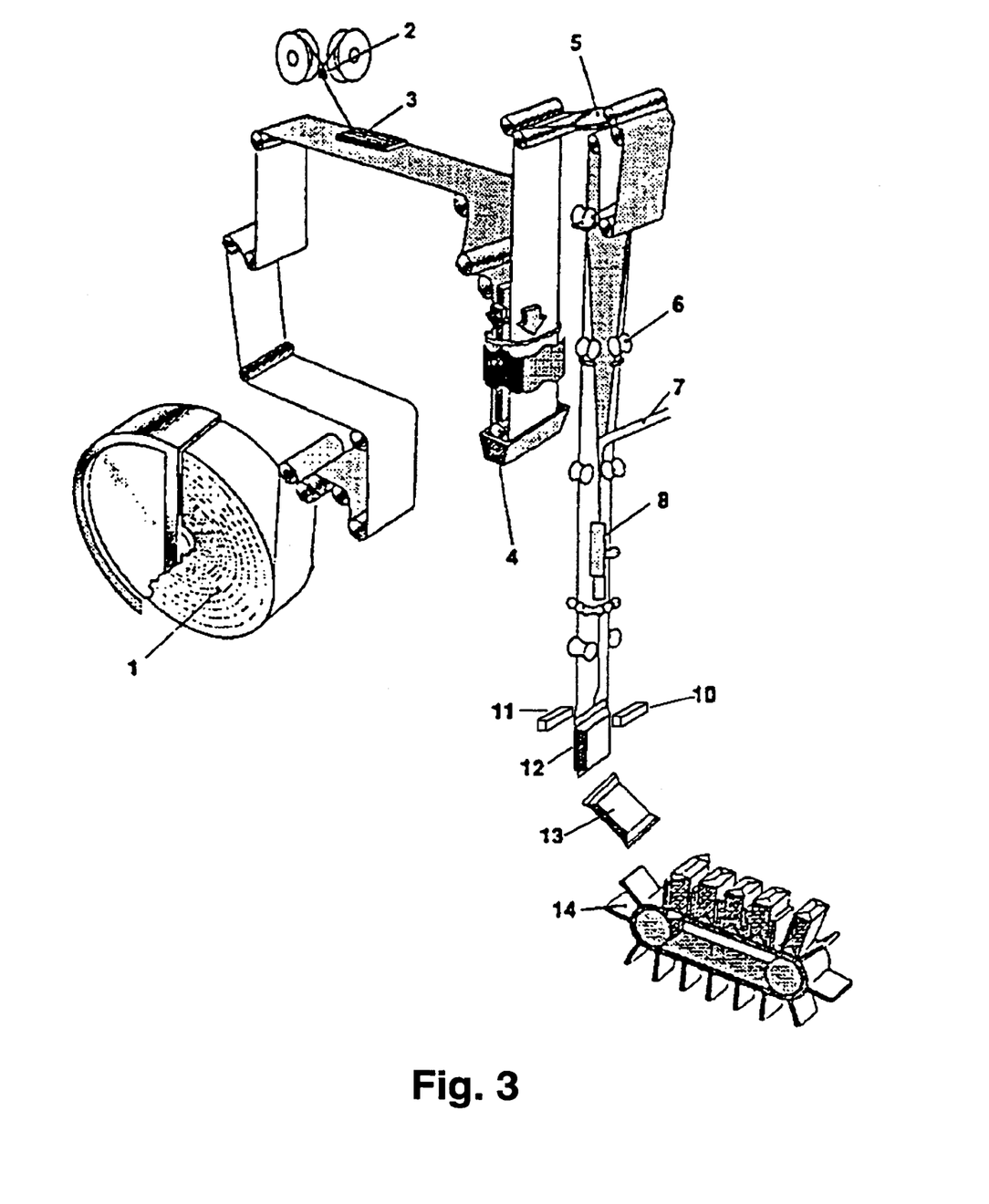
FIG. 3 is an outline figure showing the structure and operation of the filling machine equipped with the heat-sealing device of this invention.

Hereafter, although the examples about the heat-sealing device according to this invention are described based on the drawings, this invention is not limited to the examples indicated by these drawings. The outline of an example of the filling machine equipped with the heat-sealing device of this invention is shown in FIG. 3. The filling machine shown in this example is operated as follows. From a roll, a filling machine unwinds the packaging material web 1, which comprises a thermoplastic material layer as an innermost layer, and conveys the web to the inside of the filling machine with rollers. The filling machine seals the strip tape 2 to the end of the packaging material web through operation of a strip tape applicator 3, and sterilizes the packaging material web by passing it through the inside of the sterilization agent bath 4. The filling machine removes the sterilization agent with an air-knife 5, and forms the web into a tubular shape with forming rollers 6. The tube is filled up with liquid food from a filling pipe 7 extending into the tube, and is sealed by a longitudinal seal element 8 in the longitudinal direction of the tube. To advance the tube below by a length equivalent to one packaging container, the tube is pushed by seal jaws 10 and counter jaws 11 forming the heat-sealing device of this invention, and the filling machine heat-seals the tube in the transverse direction, and continuously forms pillow-shaped packaging containers 12 simultaneously. Then, a predetermined zone of the seal zone of the pillow-shaped packaging container is cut with a knife to separate each packaging container 13, and the flaps of the upper and lower sides of the separated container are folded to form the packaging container 11 having the final shape with a final holder 14.

Figure 2:
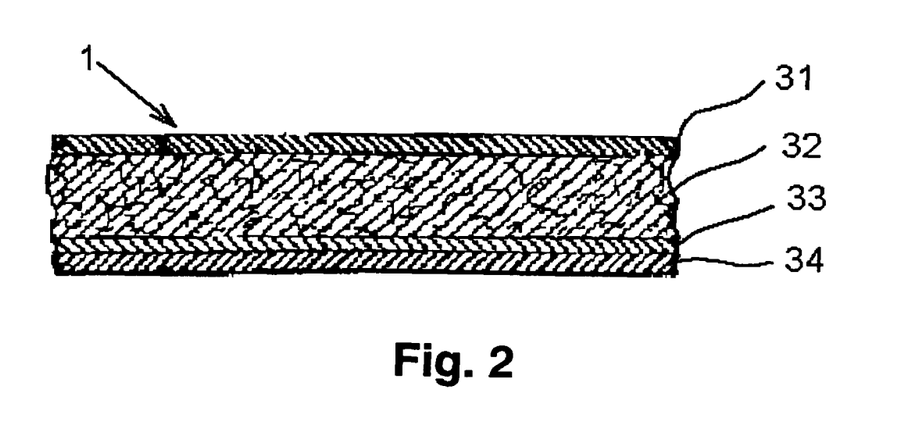
FIG. 2 is a sectional view of the packaging material used for the heat-sealing device of this invention.

An example of the packaging material 1 which can be used in this invention is shown in FIG. 2. This packaging material has the illustrated layer structure, and consists of a thermoplastic material layer 31 forming an outermost layer, a paper layer 32, a metal layer 33 forming an oxygen barrier layer, and a thermoplastic material layer 34 forming an innermost layer.

The packaging material used in this invention is not limited to the above-mentioned example, but various packaging material can be used. For example, packaging laminates can be used that contain low-density polyethylene (LDPE)/printing ink layer/paper (fibrous) substrate layer/LDPE/aluminum foil/LDPE/LDPE, LDPE/printing ink layer/paper substrate layer/LDPE/LDPE, printing ink layer/LDPE/paper substrate layer/LDPE/LDPE, and LDPE/a printing ink layer/paper substrate layer/LDPE/aluminum/polyester (PET).

Moreover, the ethylene alpha olefin copolymer (the so-called metallocene PE) which polymerized using the single site catalyst can also be used as the innermost layer or/and outermost layer in addition to the LDPE mentioned above.

Furthermore, the vapor deposited layer of an inorganic oxide can also be used as a practical substitute for the metal layer (aluminum foil) as the above-mentioned oxygen barrier layer.

Figure 1:
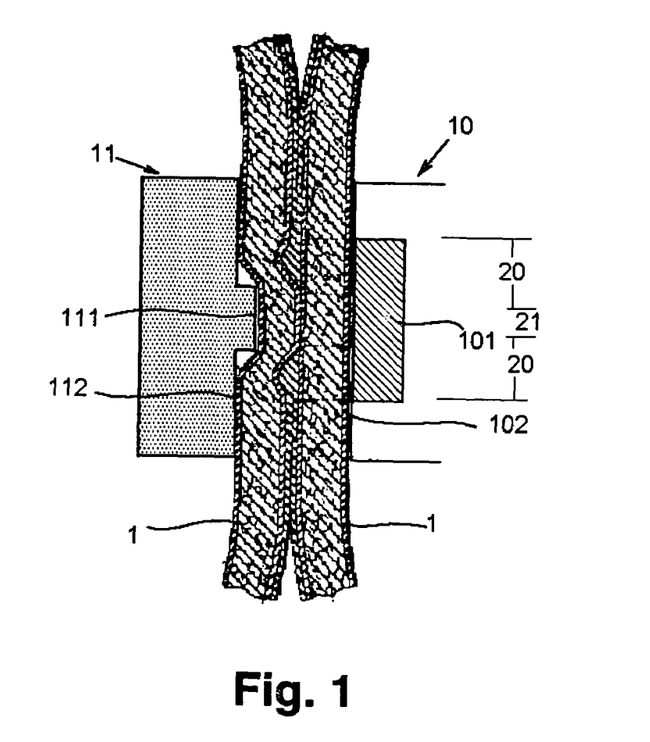
FIG. 1 is a cross-sectional view showing the structure and operation of the heat-sealing device according to a first example of this invention.

FIG. 1 shows the seal device of this invention in cross-section with the heat-healed packaging material 1. The main part of the seal jaw 10 is made from a non-conductive material, and contains the cylindrical inductor 101 of a conductive material, for example, copper.

The inductor 101 is located in the center of the main part forming the operation surface 102 of the seal jaw 10. The formed operation surface is a substantially flat surface. This inductor 101 is arranged to form the seal zone by high frequency induction heating. The packaging material in this case is a laminate which comprises the thin metal layer and the thermoplastic material innermost layer. In this high frequency induction heating, a magnetic field occurs around the coil which is connected to a high frequency power supply. An eddy current arises in the metal foil of the coil circumference, and Joule heat is generated by this eddy current and the resistance of the metal foil layer. The generated Joule heat is transmitted to the thermoplastic material innermost layer which faces the metal foil layer, and melts this thermoplastic material layer. In this example, an inductor 101 corresponds to a part of coil of the above-mentioned high frequency induction heating. Other portions (not shown) of the coil can be arranged at the reverse side of an inductor 101 or to the exterior of the seal jaw 10, etc. In this invention, the operation surface 102 of the seal jaw 10 facing the seal zone 20 comprises a substantially flat surface. The operation surface 111 of the counter jaw 11 possess a removal/mixture means.

The removal/mixture means removes seal prevention impurity from the seal zone 20, and mixes the impurity with the melted or softened (melted/softened) packaging material in the seal zone 20. In the case of this example, removal/mixture means is the ridge 111 continuously or discontinuously provided in the operation surface 112 of this counter jaw. The ridge 111 which projects from the operation surface 112 is provided in the counter jaw 11. The cross-sectional shape of this ridge 111 is mostly rectangular. The height of the ridge is 0.2 to 0.8 times the thickness of laminated material, preferably 0.5 times. The width is almost equal to the width of packaging laminated material. The ridge is not limited to this example, for example it can include a ridge with a round top, a ridge having a trapezoidal cross-section, etc.

The operation surface 102 of the seal jaw 10 contains the central zone which heats the laminated material 1. The counter jaw 11 includes the ridge 111 and the adjoining zones of the ridge. To enable high frequency welding of the laminated material 1 containing aluminum foil, the high frequency power supply is connected with an inductor 101, which heats the laminated material. When sealing together packaging laminated material which does not contain aluminum foil (metal layer 33) or other conductive layers, the laminated material heating zone may consist of, for example, resistance material. The seal device of this invention may modify this by various methods within the limits of the concept of this invention, in order to fulfill the necessary condition of sealing different packaging containers and materials. In this example, the tube of packaging material is sealed in the transverse direction to form a seal zone, and the seal zone is cut by cutting a predetermined zone 21 in the seal zone. A knife (or a certain other suitable cutting devices) operates in the predetermined zone 21. Moreover, in this example, the eddy current by the oscillating magnetic field is induced in the aluminum (metal) layer 33 of the packaging laminated material 1. The aluminum (metal) layer 33 is heated ro a temperature higher than the melting point of the adjoining thermoplastic layer in the zone corresponding to the surface of the inductor 101. The generated heat is directly transmitted to the thermoplastic layers 34 and 34 located between the aluminum layers 33 and 33, and melts the thermoplastic layer which is changed to a fluid. By virtue of the high pressure (approximately 100 kg/cm$^2$) at which the ridge 111 pushes the packaging laminated material, the melted thermoplastic material runs and flows to the zones 20 and 20 from the high-pressure zone 21 of the seal zone. The thermoplastic layers 34 and 34 which are counter to each other and located in the zone outside the seal zones 20 and 20 maintain a solid state, and are pushed, countering to each other. Without flowing out outside further, the melted thermoplastic material stops in the zone shown by reference number 20 in the seal zone, and forms the high-pressure zone 21 and the accumulation zones 20 and 20. The two layers are mixed and sealed to each other in an accumulation portion (zones 20 and 20).

The excess of the plastic that is well mixed at the accumulation portions (zones) 20 and 20 formed in the seal zone is included, and a seal of practically sufficient strength is obtained between the two layers.

Since the flow by the high pressure is very quick, the mixture of sufficient plastic material from between the two layers is guaranteed by the turbulent flow generated in the flowing plastic material.

Therefore, residual substances of the oxide and the liquid food content existing in the surface is effectively mixed within the plastic, and a film of impurities which might adversely affect the strength of the seal does not remain.

The seal device of this invention can be modified by various methods within the limits of the concept of this invention in order to fulfill the necessary condition of the seals of packaging containers.

Although the material forming the ridge in the above-mentioned example is hard in order to resist deformation associated with the pressure during the sealing step, the ridge may be made of a deformable elastic material. In this case, although the same seal zones 20 (accumulation portion) as above cannot be significantly formed between laminated packaging materials, a higher pressure can be made from a ridge portion. The seal prevention impurity which may remain in the seal zone is removed from the seal zone, and in the seal zone, melted or softened packaging material can be mixed.

Figure 4:
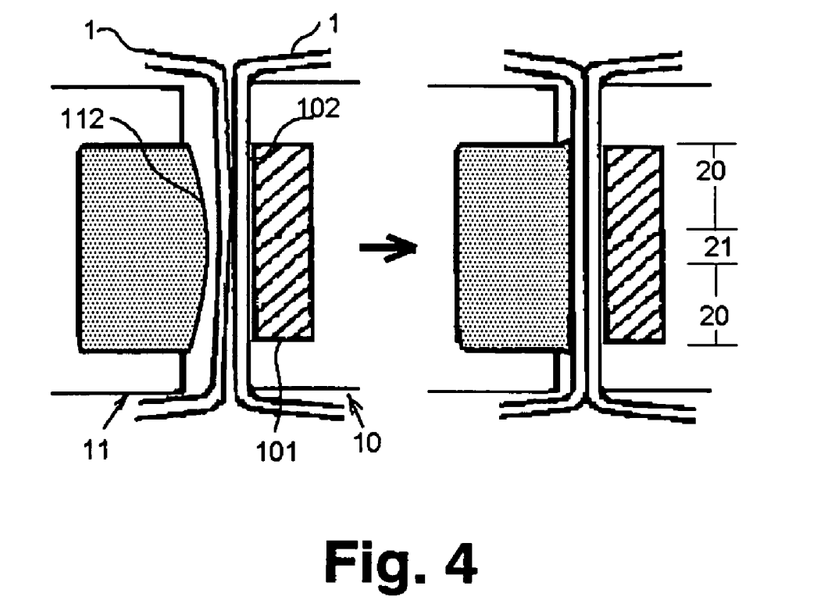
FIG. 4 is a cross-sectional view showing the structure and operation of the heat-sealing device according to a second example of this invention.

FIG. 4 illustrates a second example showing the seal steps at the time of sealing two packaging laminated materials 1 and 1 through use the device of this invention. Two packaging laminated materials 1 and 1 (or two facing portions of the same folded-up packaging laminated material) are sealed, particularly the thermoplastic layers of those innermost layers. The counter jaw 11 and the seal jaw 10 push together the packaging laminated materials. This seal jaw 10 has a flat operation surface 102 like the seal jaw shown in FIG. 1. On the other hand, the operation surface 112 on the counter jaw 11 which faces the packaging laminated material 1 is sloped so that the cross-sectional shape of the operation surface 112 is chevron-shaped. During pressing of the packaging laminated materials 1 and 1 by the seal jaw 10 and the counter jaw 11, this sloping operation surface 112 removes the seal prevention impurity, which may remain in the seal zone, from this seal zone, and the sloping surface mixes the impurity with the packaging material that is melted or softened in the seal zone. Although the mechanism is not necessarily clear, since the operation surface is inclined, the power of the pressure of packaging laminated material inclines, and when innermost thermoplastic material is still in a solid state, a content residual substance is pushed out by innermost thermoplastic material from the seal zone. The surface oxide and the content residual substance are pushed out from the seal zone in the softening/melting stage of the innermost thermoplastic material, and are mixed with the thermoplastic material. In addition, the scope of the present invention is not limited to this mechanism. As shown in the right-hand portion of FIG. 4, two packaging laminated materials are sealed by pressure and heating, the seal zones 20 and 20 containing a cutting predetermined zone are formed, and, subsequently, a knife etc. cuts the cutting predetermined zone 21.

Figure 5:
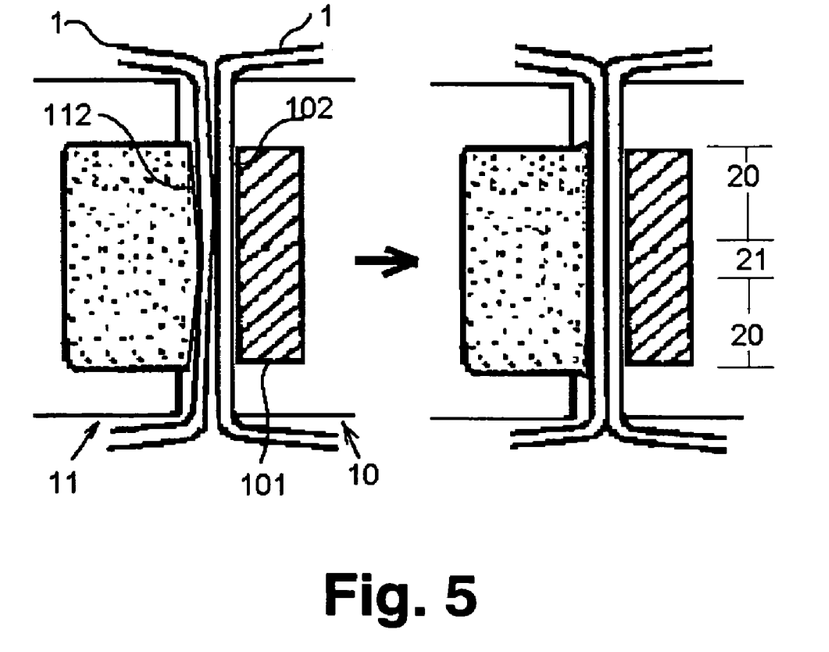
FIG. 5 is a cross-sectional view showing the structure and operation of the heat-sealing device according to a third example of this invention.

FIG. 5 illustrates a third example of the device of this invention for sealing two packaging laminated materials 1 and 1. The thermoplastic innermost layers of two packaging laminated materials 1 and 1 (or two portions of the same folded-up packaging laminated material) are positioned counter to each other in order to be sealed. The packaging laminated materials are pushed together by the seal jaw 10 and the counter jaw 11. The horn for forming a seal zone by ultrasonic heating is arranged in the seal jaw 10, and the seal jaw 10 has the flat operation surface 102.

On the other hand, the operation surface 112 provided on the counter jaw 11 which faces the packaging laminated materials 1 and 1. This operation surface 112 is sloped to possess a chevron-shaped cross-section. When this sloped surface presses two packaging laminated material 1 and 1 by the seal jaw 10 and the counter jaw 11, the seal prevention impurity which may remain in a seal zone is removed from the seal zone, and the melting/softening packaging material of the seal zone is mixed with the impurity. Since the operation surface is inclined, the pressure power applied to the packaging laminated material is inclined, and when the innermost thermoplastic material is still in a solid state, a content residual substance is pushed out from the seal zone by the solid innermost layer. In the softening/melting stage of the innermost thermoplastic material, a surface oxide and a content residual substance are mixed with the softening/melting thermoplastic material, and are pushed out from the seal zone.

As shown in the right-hand side of FIG. 5, two packaging laminated materials are sealed by pressure and heating, the seal zones 20 and 20 containing a cutting predetermined zone are formed, and, subsequently a knife, etc., cuts the cutting predetermined zone 21.

Figure 6:
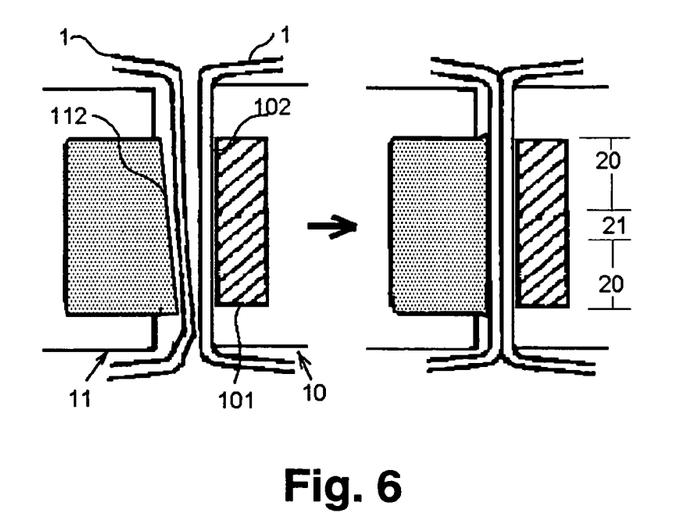
FIG. 6 is a cross-sectional view showing the structure and operation of the heat-sealing device according to a fourth example of this invention.

FIG. 6 illustrates a fourth example of the sealing device of the invention for sealing the packaging laminated materials 1 and 1. The thermoplastic innermost layers of the two packaging laminated materials 1 and 1 (or two portions of the same folded-up packaging laminated material) that are to be sealed are positioned counter to each other. The packaging laminated materials are pushed by the seal jaw 10 and the counter jaw 11.

The resistance 101 which forms a seal zone 10 by conduction heating is arranged in the seal jaw, and the seal jaw 10 has a flat operation surface 102. The operation surface 112 which is positioned counter to the packaging laminated material 1 is provided in the counter jaw 11. This operation surface possesses a cross-section having a sloping straight line shape from one end of the surface to the other as shown in FIG. 6. When the sloped surface pushes the packaging laminated materials 1 and 1 by the seal jaw 10 and the counter jaw 11, the seal prevention impurity which may remain in the seal zone is removed from this seal zone, and the melting/softening packaging material of the seal zone is mixed with the impurity. Since the operation surface is inclined, the pressure power applied to the packaging laminated material is inclined, and when innermost thermoplastic material is still in a solid state, a content residual substance is pushed out by the solid innermost layer from the seal zone. In the softening/melting stage of innermost thermoplastic material, surface oxide and content residual substance are mixed with the softening/melting thermoplastic material, and/or are pushed out from the seal zone. In addition, the invention is not limited to this mechanism.

As shown in the right-hand side of FIG. 6, the packaging laminated material is sealed by pressure and heating, the seal zones 20 and 20 containing a cutting predetermined zone are formed, and, subsequently the zone is cut by the knife, etc., in the cutting predetermined zone 21.

Figure 7:
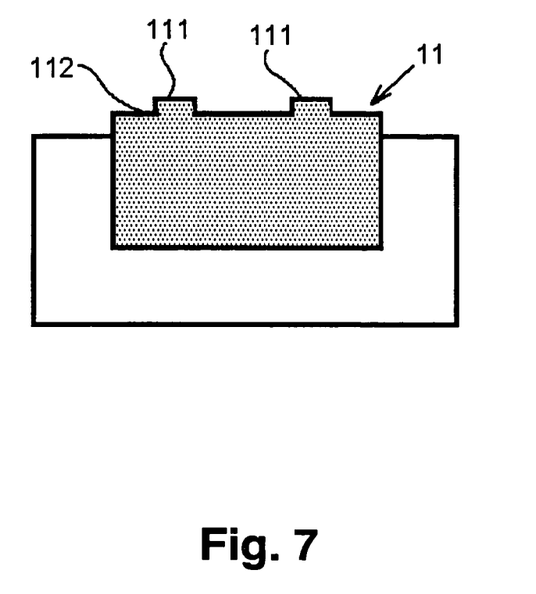
FIG. 7 is a cross-sectional view showing the structure of the counter jaw of the heat-sealing device according to a fifth example of this invention.

FIG. 7 illustrates a fifth example of the device of the invention which represents a modification of the first example shown in FIG. 1. In the first example, the counter jaw has one ridge, whereas in the firth example shown in FIG. 5 the counter jaw 11 has two ridges 111, 111 at the operation surface 112. Since the fifth example has two ridges, a third accumulation portion is formed between the two ridges 111, 111. In this accumulation portion, the seal prevention impurity is mixed with melting/softening thermoplastic material, and the accumulation portion inhibits seal prevention.

With the formation of this third accumulation portion, the seal intensity is strengthened, the removal distance of a seal prevention impurity is shortened, and a quicker seal is made possible.

Figure 8:
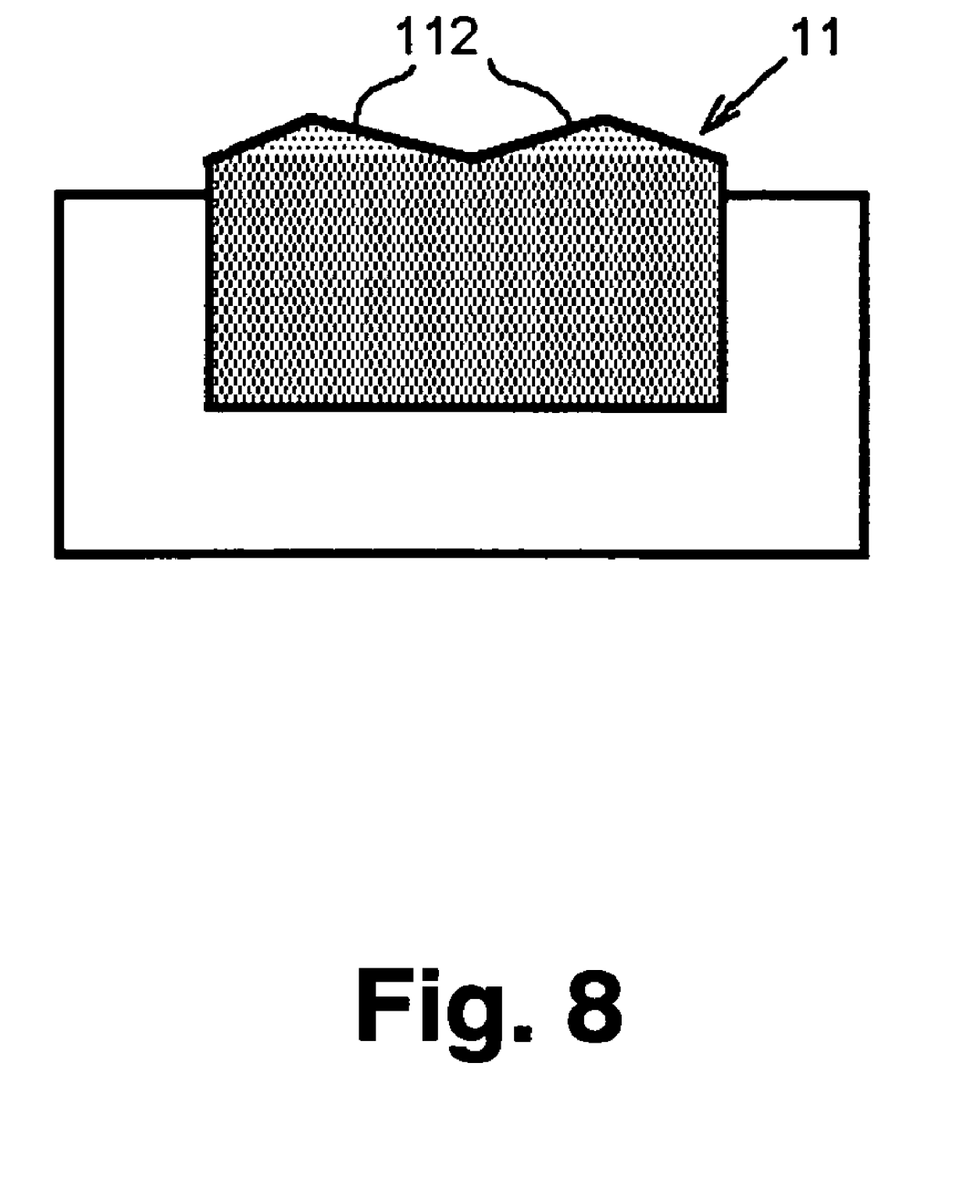
FIG. 8 is a cross-sectional view showing the structure of the counter jaw of the heat-sealing device according to a sixth example of this invention.

FIG. 8 illustrates a sixth example of the device of the present invention which represents a modification of the second example shown in FIG. 4. In the second example the cross-section of the operation surface possesses a single chevron-shaped element, whereas in this sixth example, the counter jaw 11 has two chevron-shaped elements at the operation surface 112. The sixth example is the same as the second example in general. Since the sixth example has two chevron-shaped elements, the mixed portion (not shown) of a thermoplastic material is formed between these two chevron-shaped elements. In this mixed portion, seal prevention impurity is mixed with melting/softening thermoplastic material, and the mixed portion avoids seal prevention. Like the formation of the third accumulation portion mentioned above in connection with FIG. 5, by the formation of the mixed portion, seal intensity is strengthened, removal/move distance of a seal prevention impurity is shortened, and a quicker seal is made possible.

Based on the above-described embodiments of the present invention, the following advantages are shown by the seal device and the filling machine of this invention. Even if the packaging material contains a thermoplastic layer polluted by impurities, the seal performances can have the desired strength and the desired liquid tight characteristics. In addition, if the packaging materials are sealed under the liquid surface of a liquid food, and seal prevention residual substance can be removed from the surface of the thermoplastic layers, and/or the seal prevention residual substance can be well mixed. Also, if the packaging laminated material is covered with residual substance of the oxide and the content, etc., the bad influence associated with such seal prevention impurity can be reduced, and a possible optimum seal can be obtained.

In the seal jaw and counter jaw in the packaging system, the main function of the counter jaw is to apply pressure and the function of the counter jaw has been recognized to be of low importance compared with the seal jaw. However, the working efficiency and cost performance are optimized by decentralizing the function to the seal jaw and the counter jaw. Stagnant content liquid is not formed in the seal zone, and contents liquid such as juice does not adhere hygienically to the cross section of a seal zone. Since the seal jaw has a flat operation surface, the generating high frequency magnetic field is uniform and smooth in heat-healing by the high frequency induction heating with the inductor of the seal jaw. Moreover, when heat-healing by ultrasonic heating using the horn of a seal jaw, there is no unevenness in a horn surface, uniform heating can be enabled, and a seal which does not have the worn-out crack of a heat-sealing surface, and roughness can be further obtained.

The heat-sealing device of this invention and its filling machine are used to manufacture packaging containers filled with liquid food, such as milk and fruit drinks, from a packaging material web.

What is claimed is:

1. A heat-sealing device which transversely seals a tube shaped packaging material filled up with liquid food to form a seal zone of the tube shaped packaging material through softening or melting of plastic material forming a part of the tube shaped packaging material, comprising:

a seal jaw and a counter jaw positioned in opposition to one another, the seal jaw including means for effecting softening or melting of the plastic material forming a part of the tube shaped packaging material, the seal jaw and the counter jaw both including an operation surface that faces and contacts the seal zone during transverse sealing under a liquid surface of the liquid food, the operation surface of the seal jaw being a flat surface across its entire extent, the seal jaw heating the packaging material to soften or melt the plastic material so that the seal zone is coextensive with the flat operation surface of the seal jaw, the operation surface of the counter jaw being formed with at least two raised ridges or at least two chevron-shaped elements to remove seal prevention impurity including the liquid food which may remain in the seal zone, or to mix the seal prevention impurity with the softened or melted plastic material.

2. The heat-sealing device of claim 1, wherein the operation surface of the counter jaw is formed as a sloped surface.

3. The heat-sealing device of claim 1, wherein the means for effecting softening or melting of the plastic material forming a part of the tube shaped packaging material includes an inductor for high frequency induction heating.

4. The heat-sealing device of claim 1, wherein the means for effecting softening or melting of the plastic material forming a part of the tube shaped packaging material includes a horn for forming the seal zone by ultrasonic heating.

5. The heat-sealing device of claim 1, wherein the means for effecting softening or melting of the plastic material forming a part of the tube shaped packaging material includes a resistance body for forming the seal zone by heating.

6. The heat-sealing device of claim 1, wherein the operation surface of the counter jaw is formed with the at least two raised ridges or the at least two chevron-shaped elements to remove seal prevention impurity including the liquid food which may remain in the seal zone, and to mix the seal prevention impurity with the softened or melted plastic material.

7. A heat-sealing device which transversely heat-seals a tube shaped packaging material, formed from a packaging material web and filled up with liquid food, in a seal zone of the tube shaped packaging material that contains a cutting predetermined zone through softening or melting of plastic material forming the packaging material, the heat-sealing device comprising:

a seal jaw and a counter jaw;
the seal jaw and the counter jaw both including an operation surface that faces and contacts the seal zone during transverse sealing under a liquid surface of the liquid food, the operation surface of the seal jaw being a flat surface across its entire extent, the seal jaw heating the packaging material to soften or melt the plastic material so that the seal zone is coextensive with the flat operation surface of the seal jaw, the operation surface of the counter jaw including removal/mixture means for removing from the seal zone seal prevention impurity including the liquid food which may remain in the seal zone, or mixing the seal prevention impurity with the plastic material that has softened or melted, the removal/mixture means comprising at least two raised ridges or at least two chevron-shaped elements on the operation surface of the counter jaw.

8. The heat-sealing device of claim 7, wherein the removal/mixture means is a sloped surface forming the operation surface of the counter jaw.

9. The heat-sealing device of claim 7, including an inductor for high frequency induction heating that is arranged at the seal jaw, and the packaging material comprises a metal thin layer and a thermoplastic material innermost layer.

10. The heat-sealing device of claim 7, including a horn for forming the seal zone by ultrasonic heating that is arranged at the seal jaw, and the packaging material includes at least a thermoplastic material innermost layer.

11. The heat-sealing device of claim 7, including a resistance body for forming the seal zone by heating that is arranged at the seal jaw, and the packaging material includes at least a thermoplastic material innermost layer.

12. The heat-sealing device of claim 7, wherein the removal/mixture means removes from the seal zone seal prevention impurity including the liquid food which may remain in the seal zone and mixes the seal prevention impurity with the plastic material that has softened or melted.

13. A filling machine for forming an advancing packaging material web into a tube shaped packaging material, filling up liquid food in the tube shaped packaging material, and transversely heat-sealing the tube shaped packaging material in a seal zone of the packaging material containing a cutting predetermined zone through softening or melting of plastic material forming the packaging material, comprising:

a heat-sealing device for forming the seal zone, the heat sealing device comprising a seal jaw and a counter jaw that both include an operation surface facing and contacting the seal zone during transverse sealing under the liquid surface of the liquid food, the operation surface of the seal jaw being a flat surface across its entire extent, the seal jaw heating the packaging material to soften or melt the plastic material so that the seal zone is coextensive with the flat operation surface of the seal jaw, the operation surface of the counter jaw including removal/mixture means on the operation surface of the counter jaw for removing from the seal zone seal prevention impurity which may remain in the seal zone, or mixing the seal prevention impurity including the liquid food with the plastic material that has softened or melted, the removal/mixture means comprising at least two raised ridges or at least two chevron-shaped elements on the operation surface of the counter jaw.

14. The filling machine of claim 13, wherein the removal/mixture means is a sloped surface forming the operation surface of the counter jaw.

15. The filling machine of claim 13, including an inductor for high frequency induction heating that is arranged at the seal jaw, and the packaging material comprises a metal thin layer and a thermoplastic material innermost layer.

16. The filling machine of claim 13, wherein a horn for forming the seal zone by ultrasonic heating that is arranged at the seal jaw, and the packaging material includes at least a thermoplastic material innermost layer.

17. The filling machine of claim 13, including a resistance body for forming the seal zone by heating that is arranged at the seal jaw, and the packaging material includes at least a thermoplastic material innermost layer.

18. The filling machine of claim 13, wherein the removal/mixture means on the operation surface of the counter jaw removes from the seal zone seal prevention impurity which may remain in the seal zone, and mixes the seal prevention impurity including the liquid food with the plastic material that has softened or melted.

* * * * *